T. McMANUS.
FLOWER POT HOLDER.
APPLICATION FILED FEB. 26, 1910.
977,818.
Patented Dec. 6, 1910.
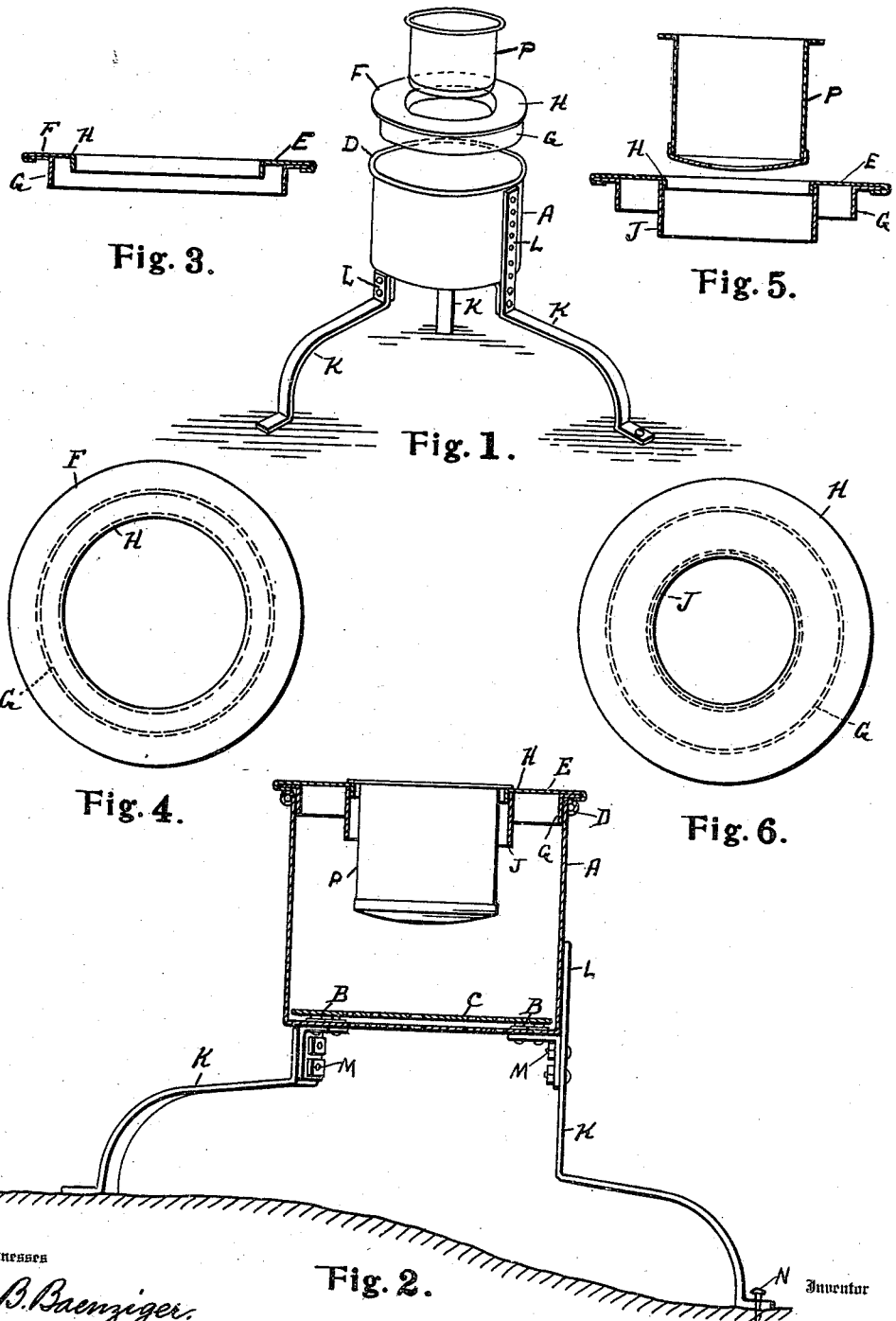

UNITED STATES PATENT OFFICE.

THOMAS McMANUS, OF DETROIT, MICHIGAN.

FLOWER-POT HOLDER.

977,818.     Specification of Letters Patent.     Patented Dec. 6, 1910.

Application filed February 26, 1910. Serial No. 546,139.

*To all whom it may concern:*

Be it known that I, THOMAS MCMANUS, a citizen of the United States, residing at Detroit, county of Wayne, State of Michigan, have invented a certain new and useful Improvement in Flower-Pot Holders, and declare the following to be a full, clear, and exact description of the same, such as will enable others skilled in the art to which it pertains to make and use the same, reference being had to the accompanying drawings, which form a part of this specification.

This invention relates to flower pot holders, and has for its object an improved device of this type adapted to securely hold within a main shell or casing a flower pot of any size within ordinary range, and to secure the pot and casing when thus assembled against easy over-turning, either by handling or by the wind, when it is located in an exposed place, this security against over-turning being regardless and independent of inequalities in the surface of the ground upon which the device is resting; by the use of this device the destruction of the grass of a lawn by resting the entire bottom of a flower pot on the lawn is avoided.

Figure 1, is a perspective showing the holder with a jar-engaging collar sufficiently removed to show its structure and relation to the main shell. Fig. 2, is a vertical section through the center, with the supporting legs or braces resting on uneven ground. Fig. 3, is a vertical section of one of the pot-engaging collar members. Fig. 4, is a plan view of the collar of Fig. 3. Fig. 5, is a sectional elevation of the removable collar and pot-holding shell shown detached from one another. Fig. 6, is a plan view of the collar member of Fig. 5.

A represents the shell or casing, which is preferably of galvanized metal, in whose perforated bottom are located a plurality of knobs or pins B, upon which there may rest a removable perforated flooring piece C. This, however, is not essential, as the bottom of the flower pot P may rest directly upon the bottom of the casing itself, or upon the knobs B, or even be suspended from direct contact therewith by means of one of the removable collars to be hereafter described. If the flower pot is of such size that the top edges D of the casing A engage closely about its sloping side walls or its top collar, none of the removable collar members hereinafter referred to need be used. If, however, the body of the flower pot is of such size that, if placed within the casing member A, its sides would be spaced therefrom, a removable collar member F may first be placed about the peripheral edge of the casing A. This collar member has an inwardly extending flange E which reaches from engagement over the top of the side wall of the casing A inwardly, and with one portion G of the exact internal diameter of the casing A, extending downwardly therewithin, as shown particularly in Figs. 1 and 2, while its inwardly extending collar H reaches through toward the center, and is also turned downwardly sufficient to form a finishing rounded edge or beading. In the type of collar illustrated in Figs. 5 and 6, however, this inwardly extending flange portion H reaches so far in, and then extends so far down from the top surface as thus located, with its pot-engaging collar J, that even if the pot to be held is not only smaller in diameter than the casing member A, but of considerably less height, it is not lost or insecurely inclosed within the much larger interior of the casing A, but is held firmly with respect thereto by the engagement about its peripheral portion of this depending collar J. A set or series of this collar of varying size is provided with each casing A so that the desired one may be used in each case.

Located at opposing points about the outer periphery casing A are brace members or legs K, of which there must be at least three, although I do not limit myself to that number. One or more of these are adjustably attached at their inner portions L to the casing A by means of the screw clamps M, of any desired type so that by adjustment of any one of them up or down as occasion may require, while if the holder rests upon an even surface the flower-pot and its contents will be held in upright position. If, however, on one side of the intended location of the holder the ground slopes away or rises abruptly, the position of the brace or leg K located on that side will be changed correspondingly either up or down as shown in Fig. 2, so as to give a firm horizontal positioning of the holder as a whole. The lateral extent of the leg or brace members is intended to prevent the easy over-turning of the casing and its contained pot under the influence of the wind. The pin N may be used to fasten the foot of any one of the legs K to the ground.

What I claim is:—

1. A flower pot holder, having, in combination with a casing member, a removable collar member adapted to be interposed between the wall of the casing and the outer face of an included flower pot, and adjustable supporting members arranged peripherally of said casing and extending outwardly therefrom, whereby it may be maintained in upright position regardless of the unevenness of the surface whereon the holder is placed, substantially as described.

2. In a flower pot holder, in combination with a holding shell, a plurality of outwardly and downwardly extending adjustable supporting members therefor, and removable means adapted to be inserted between a flower pot and the holding shell and to extend down over a portion of the pot whereby it is firmly held from undesired movement with respect to the shell, substantially as described.

3. In a flower pot holder, the combination of a holding shell, a removable inwardly flanged collar member adapted to fit over the top edge of said holding shell, a pot holding casing adapted to be supported by said collar member spaced from the sides and bottom of the holding shell, and independently adjustable brace members for the holding shell extending outwardly and downwardly from opposing points on the outer face thereof, substantially as described.

4. A flower pot holder, having, in combination with a casing member, a removable collar member adapted to be fitted over the top edge thereof, said collar member extending inwardly therefrom and having downwardly depending flanges at its inner and outer edges, a removable pot-holding casing adapted to fit closely within said collar member, the upper portion of its sides being engaged by the inner depending flange thereof, whereby it is held from contact with the sides and bottom of the first-named casing, and adjustable brace members for the holding shell extending downwardly and outwardly from the peripheral portion of the first-named casing, whereby it is held from contact with the ground and from unintentional overturning.

In testimony whereof, I sign this specification in the presence of two witnesses.

THOMAS McMANUS.

Witnesses:
VIRGINIA C. SPRATT,
WILLIAM M. SWAN.